United States Patent
Fenger et al.

(10) Patent No.: US 7,818,596 B2
(45) Date of Patent: Oct. 19, 2010

(54) METHOD AND APPARATUS OF POWER MANAGEMENT OF PROCESSOR

(75) Inventors: Russell J. Fenger, Beaverton, OR (US); Anil Aggarwal, Portland, OR (US); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 902 days.

(21) Appl. No.: 11/638,700

(22) Filed: Dec. 14, 2006

(65) Prior Publication Data
US 2008/0148027 A1   Jun. 19, 2008

(51) Int. Cl.
G06F 1/00   (2006.01)

(52) U.S. Cl. ................ 713/322; 713/300; 713/320; 713/502

(58) Field of Classification Search .......... 713/300, 713/320, 322, 502
See application file for complete search history.

(56) References Cited

U.S. PATENT DOCUMENTS

| | | | |
|---|---|---|---|
| 7,089,430 B2 | 8/2006 | Cooper | |
| 7,171,570 B2 * | 1/2007 | Cox et al. | 713/300 |
| 7,219,252 B1 * | 5/2007 | Li et al. | 713/501 |
| 7,340,622 B2 * | 3/2008 | Cox et al. | 713/300 |
| 7,584,369 B2 * | 9/2009 | Capps et al. | 713/300 |
| 7,617,403 B2 * | 11/2009 | Capps et al. | 713/300 |
| 7,650,518 B2 * | 1/2010 | Allarey et al. | 713/300 |
| 2002/0087896 A1 | 7/2002 | Cline et al. | |
| 2004/0006720 A1 * | 1/2004 | Atkinson | 713/300 |
| 2004/0071184 A1 | 4/2004 | Naveh et al. | |
| 2004/0210787 A1 * | 10/2004 | Cox et al. | 713/322 |
| 2005/0005182 A1 * | 1/2005 | Tomita | 713/400 |
| 2005/0060589 A1 * | 3/2005 | Athas | 713/300 |
| 2006/0031691 A1 * | 2/2006 | Bacchus et al. | 713/300 |
| 2006/0053326 A1 * | 3/2006 | Naveh et al. | 713/323 |
| 2006/0265616 A1 | 11/2006 | Cesare et al. | |
| 2007/0061603 A1 * | 3/2007 | Cox et al. | 713/300 |
| 2007/0124609 A1 * | 5/2007 | Lee | 713/300 |
| 2008/0005592 A1 * | 1/2008 | Allarey et al. | 713/300 |
| 2008/0028236 A1 * | 1/2008 | Capps et al. | 713/300 |
| 2008/0028244 A1 * | 1/2008 | Capps et al. | 713/324 |

OTHER PUBLICATIONS

"Power and Thermal Management in the Intel Core Duo Processor", Intel Technology Journal vol. 10 Issue 02. May 15, 2006.
"ACPI 3.0: Supporting Advanced Platform Configuration and Power Management", Guy Therien Principle Engineer, Intel Developer Forum, Intel Corporation.
International Search Report fo International Application PCT/US2007/082959, mailed on Feb. 15, 2008.

* cited by examiner

*Primary Examiner*—Thomas Lee
*Assistant Examiner*—Jaweed A Abbaszadeh
(74) *Attorney, Agent, or Firm*—Pearl Cohen Zedek Latzer, LLP

(57) ABSTRACT

Briefly, a processor and a method of setting a performance state of a turbo mode enabled processor. The method includes determining an effective performance state over a predetermined time period, calculating a target performance state based on core utilization and the effective performance state over the predetermined time period and setting the turbo mode enabled processor to a turbo mode performance state.

18 Claims, 3 Drawing Sheets

METHOD AND APPARATUS OF POWER MANAGEMENT OF PROCESSOR

BACKGROUND OF THE INVENTION

In computer systems, for example computer system that using general purpose, multi-core (on die Clip Multi-Processing (CMP)) processor and more specifically, a CMP processor using adaptive power management policies, the processor performance state (P-state) adjusts based on demand. As central processor unit (CPU) utilization decreases, the processor may transition to a lower performance state to conserve power. As the CPU utilization increases, the processor may transition to a higher performance state and may consume more power.

In existing operating systems, a target P-state selection is based on the combination of CPU utilization and the last selected P-state. With a Turbo Mode (TM) capable processor, at the last selected P-state, the processor frequency may increase to a highest frequency available when thermal constraints allow it, the actual frequency at which the processor is running may not always correspond to the last selected P-state. This will result incorrect target P-state selection resulting in undesirable performance degradation.

Advanced Configuration and Power Interface (ACPI) is a power management system that allows a computer operation system to control the amount of power consumed by CPU and peripheral devices of the computer system. In existing ACPI processor which includes P-state information, each selectable core frequency is represented with corresponding control, status, and latency information. A replacement of the highest frequency of the last selected P-state with a TM frequency may result in, an increased usage of additional processing power when not needed. Furthermore, this may result in performance degrading caused by P-state fluctuations due to unnecessary transitions to TM.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
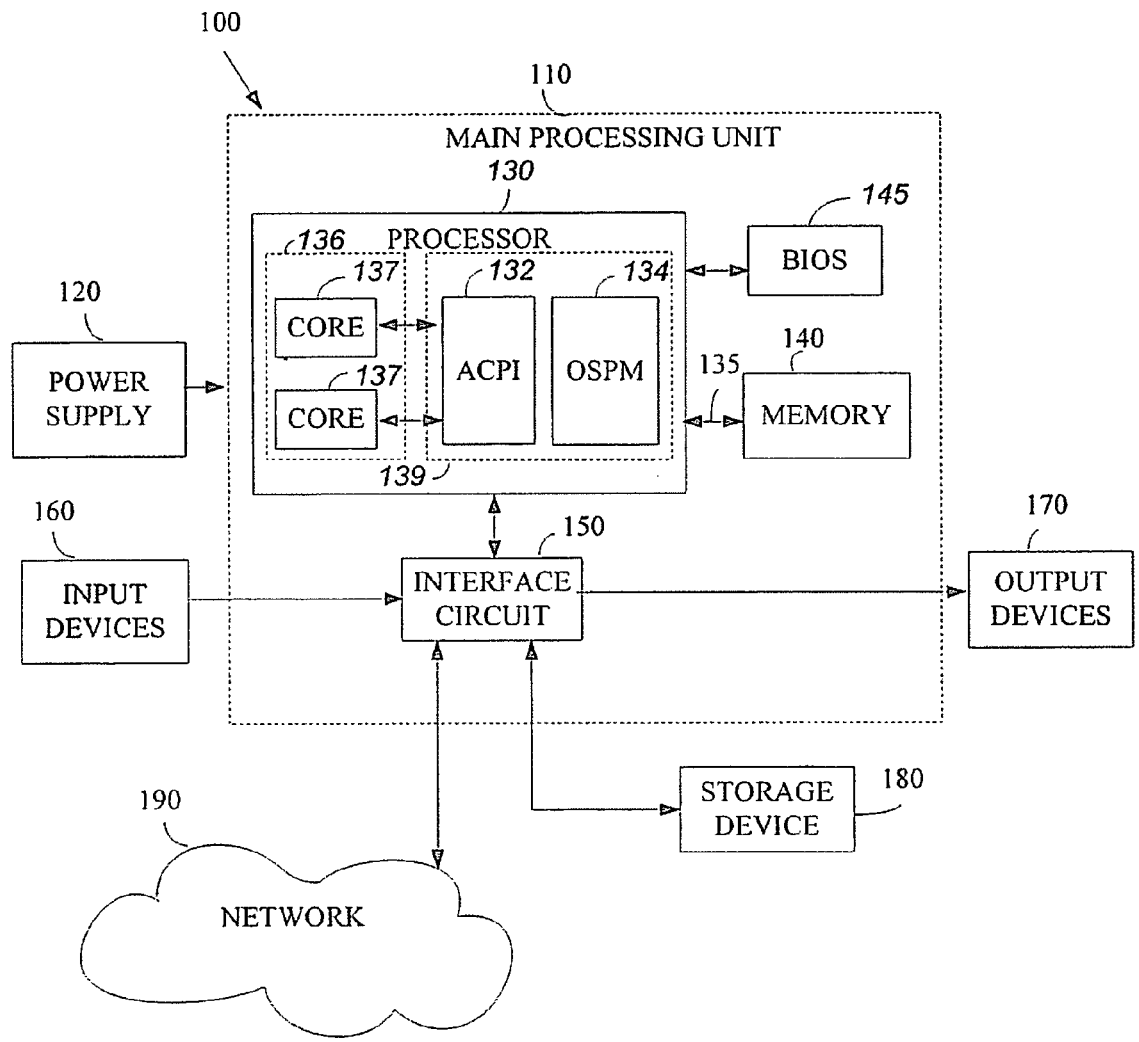
FIG. 1 is a schematic illustration of a block diagram of computer system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or instructions.

It should be understood that the present invention may be used in a variety of applications. Although the present invention is not limited in this respect, the circuits and techniques disclosed herein may be used in many apparatuses such as computer systems, processors, CPU or the like. Processors intended to be included within the scope of the present invention include, by way of example only, a reduced instruction set computer (RISC), a processor that have a pipeline, a complex instruction set computer (CISC), a multi core processor, a computer platform and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a block diagram of a computer system 100 according to an exemplary embodiment of the invention is shown. Although the scope of the present invention is not limited in this respect, computer system 100 may be a personal computer (PC), a personal digital assistant (PDA), an Internet appliance, a cellular telephone, a laptop computer, a mobile unit, a wireless communication device and/or any other computing device.

According to exemplary embodiments of the present invention, computer system 100 may include a main processing unit 110 powered by a power supply 120. According to exemplary embodiments of the present invention, main processing unit 110 may include a Turbo Mode (TM) capable processor 130 electrically coupled by a system interconnect 135 to a memory device 140 and one or more interface circuits 150. For example, the system interconnect 135 may be an address/data bus, if desired. It should be understood that interconnects other than busses may be used to connect TM capable processor 130 to memory device 140. For example, one or more dedicated lines and/or a crossbar may be used to connect processor 130 to memory device 140.

According to some embodiments of the invention, TM capable processor 130 may include an operating system 139 and a CPU 136 which includes one or more cores 137. Operating system 139 may execute an ACPI 132 and an operating system power management (OSPM) application 134, if desired. In addition, processor 130 may include a cache memory (not shown), such as, for example, static random access memory (SRAM) and the like, or any other type of internal integrated memory. Memory device 140 may include a dynamic random access memory (DRAM), a non-volatile memory, or the like. In one example, memory device 140 may store a software program which may be executed by processor 130, if desired.

Although the scope of the present invention is not limited in this respect, interface circuit(s) 150 may include an Ethernet interface and/or a Universal Serial Bus (USB) interface, and/or the like. In some exemplary embodiments of the invention, one or more input devices 160 may be connected to interface circuits 150 for entering data and commands into the main processing unit 110. For example, input devices 160 may include a keyboard, mouse, touch screen, track pad, track ball, isopoint, a voice recognition system, and/or the like.

Although the scope of the present invention is not limited in this respect, the output devices 170 may be operably coupled to main processing unit 110 via one or more of the interface circuits 150 and may include one or more displays, printers, speakers, and/or other output devices, if desired. For example, one of the Output devices may be a display. The display may be a cathode ray tube (CRT), a liquid crystal display (LCD), or any other type of display.

According to some embodiments of the invention, computer system 100 may include one or more storage devices 180. For example, computer system 100 may include one or more hard drives, one or more compact disk (CD) drive, one or more digital versatile disk drives (DVD), and/or other computer media input/output (I/O) devices, if desired.

According to exemplary embodiment of the present invention, computer system 100 may exchange data with other devices via a connection to a network 190. The network connection may include any type of network connection, such as an Ethernet connection, a digital subscriber line (DSL), a telephone line, a coaxial cable, etc. Network 190 may be any type of network, such as the Internet, a telephone network, a cable network, a wireless network such as, for example, a network complying IEEE standard 802.11, 1999 include one or more IEEE 802.11 related standards, IEEE 802.16 Standard for Wireless Metropolitan Area Networks and/or the like.

According to one exemplary embodiment of the invention, TM capable processor 130 may operate in two or more operating frequencies. A selection of the operating frequency of TM capable processor 130 may be done by OSPM 134 based on TM capable processor 130 load observed over a window of time, if desired. In turbo mode, ACPI 132 may provide a target P-state to OSPM 134. OSPM 134 may set a power consumption target point and may modify the processor operating frequency and/or voltage according to the selected entry in the target P-state. In some embodiment of the invention the target P-state that related to the processor turbo mode may be provided by a basic input output system (BIOS) 145. This, turbo related P-state may be related to the highest operating frequency of the processor in turbo mode. OSPM 134 logic may accurately select the appropriate P-state needed to meet computer system 100 performance needs. It should be understood that ACPI 132 and/or OSPM 134 may be implemented by hardware, by software, and/or by any combination of hardware and/or software.

Figure 2:
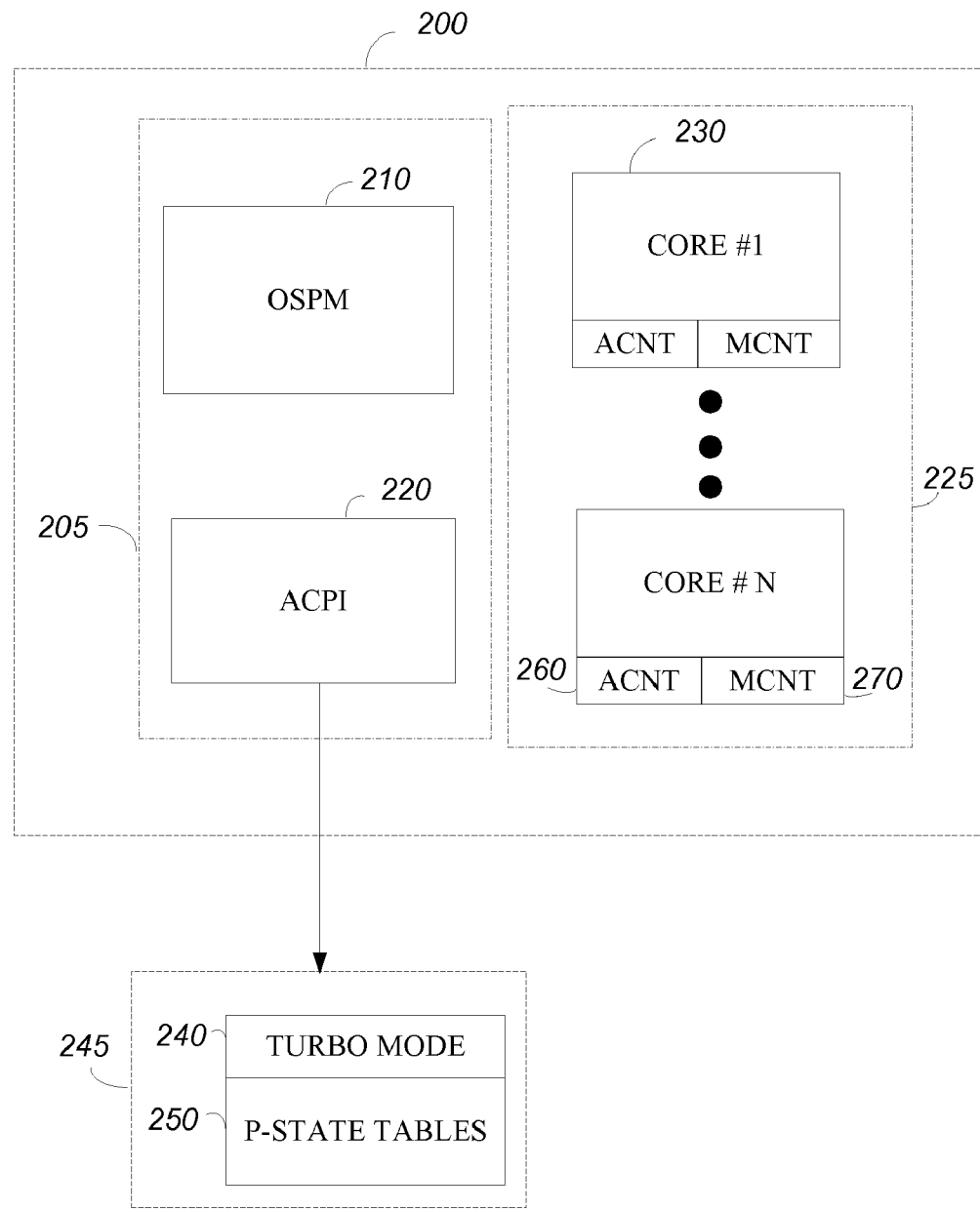
FIG. 2 is a schematic illustration of a block diagram of a portion of a processing platform according to an exemplary embodiment of the invention.

Turning to FIG. 2, a block diagram of a portion of a processing platform 200 according to an exemplary embodiment of the invention is shown. Although the scope of the present invention is not limited in this respect, portion of processing platform 200 may include an operating system 205 including OSPM 210 and an ACPI 220, a CPU 225 which includes cores 1 . . . N 230, and a BIOS 245 which includes a turbo mode 240 and one or more P-state tables 250. According to this exemplary embodiment an actual counts counter (ACNT) 260 and maximum counts counter (MCNT) 270 may be operably coupled to each one of core 1 . . . N 230.

According to exemplary embodiments of the invention, TM enabled processing platform 200 may use OSPM 210, ACPI 220, ACNT 260 and MCNT 270, and P-State tables 250 to set an optimal P-state for cores 1 . . . N 230 of processing platform 200 while the TM enabled processor is running in turbo mode 240.

According to exemplary embodiments of the invention P-State tables 230 may include the below table e.g., Table 1 for each core 1 . . . N of the processing platform 200.

TABLE 1

| P-state | PSS Frequency | % Max Frequency | Increase Level | Decrease Level |
|---------|---------------|-----------------|----------------|----------------|
| P0 | 3001 | 100 | 101 | 98 |
| P1 | 3000 | 99 | 98 | 84 |
| P2 | 2666 | 88 | 85 | 73 |
| P3 | 2333 | 77 | 74 | 62 |
| P4 | 2000 | 66 | 63 | 0 |

Table 1 may include a plurality of selectable P-states (e.g., P0, P1 . . . P4). OSPM 210 may use a selected P-state to set an operating frequency and an operating voltage of each one of cores 1 . . . N 230, independently. Furthermore, table 1 may include command word associated with each P-state. The command word may download parameters of the selected P-state (e.g., PSS Frequency, % Max Frequency, Increase Level, Decrease Level and the like to control and set CPU 225 in the desired P-state. For example, selectable P-states P1-P4 may include an actual selectable operating frequency (e.g., PSS Frequency) of CPU 225. For example, if P1 is selected the operating frequency of CPU 225 may be set to 3.000 MHz.

Although the scope of the present invention is not limited to this exemplary P-state table, P0 is a turbo mode P-state and may be selected when TM enabled processor is running in turbo mode 240. However, the PSS Frequency of P0 does not represent an actual selectable frequency but includes ACPI information of TM frequency (e.g. 3333 MHz) which is represented by a number which is higher then the actual selectable frequency of the core. For example, in Table 1 the number of P0 state is the actual highest selected frequency plus 1 (e.g. 3001 MHz). Writing a control word and/or a command to CPU 225 or to one of its cores (e.g., core 1 . . . N 230) to change frequency from the P1 to P0 will put CPU 225 into TM. For example, writing the command word associated with 3001 MHz on table 1 may set the CPU to run in a highest possible frequency e.g. 3333 MHz which is different then the frequency indicated in table 1 (e.g., 3001 MHz). The non Turbo frequency of 3001 MHz, in this example, may be considered as "Guaranteed" frequency with is exposed by the CPU table while the 3333 MHz is the actual "Turbo" frequency, although the scope of the present invention is not limited in this respect.

According to some embodiments of the invention, P0 may be selected only when a core of the processing platform 200 is operating in turbo mode 250. In P0 state the CPU 225 and/or at least on of its cores 1 . . . N 230, may use its maximum performance capability and may consume maximum power. Other states of P-State tables may represent power consumption state of cores 1 . . . N 230 during normal operating mode. For example, P1 state represents an actual guaranteed frequency (e.g. 3000 MHz). In this performance power state, the performance capability the processor is limited below its maximum and consumes less than maximum power. In P2-P4 P-states, the performance capability the processor may be decreased until its minimum level (at P4) and consumes minimal power while remaining in an active state.

Although the scope of the present invention is not limited in this respect, high and low P-State settings may be stored in the CPU's "Machine Specific Registers (MSR's)", while any additional P-State combinations may be stored in BIOS 245. By providing additional P-State settings, Operating System 205 may tune CPU 225 or in at least one of its cores 1 . . . N 230, in more accuracy to the optimum performance and power setting for a specific workload.

According to some other embodiments of the invention, table 1 may not encode the frequency directly. Instead, the table may store the multiplier setting that is multiplied by a front-side bus frequency to generate the core frequency. With this approach, TM may only be used when the core utilization requires the need for additional processing power and since the TM frequency is not guaranteed, the OSPM 210 may increase or decrease the P-state based on the increase and decrease in the core utilization.

According to some embodiments of the invention, in order to set a target P-state ACNT 260 and MCNT 270 may be used. For example, MCNT 270 may count maximum number of execute clocks at the maximum non-turbo mode core frequency and the ACNT 260 may count the number of execute clocks at actual core frequency. The ratio of (ACNT/MCNT) *100 may be used by OSPM 210 to accurately select the appropriate P-state needed to meet the system's performance needs. For example, if the ration is higher then 100% it may indicate that the core is in turbo mode and P0 may be selected. OSPM 210 may command ACPI 220 to increase the frequency to the maximum operating frequency, if desired. The command may be store in a command register (not shown) and may include a number (e.g., 3.4, 3.2, etc). The number may represent the desired operating frequency of the core according to the selected P-State.

Figure 3:
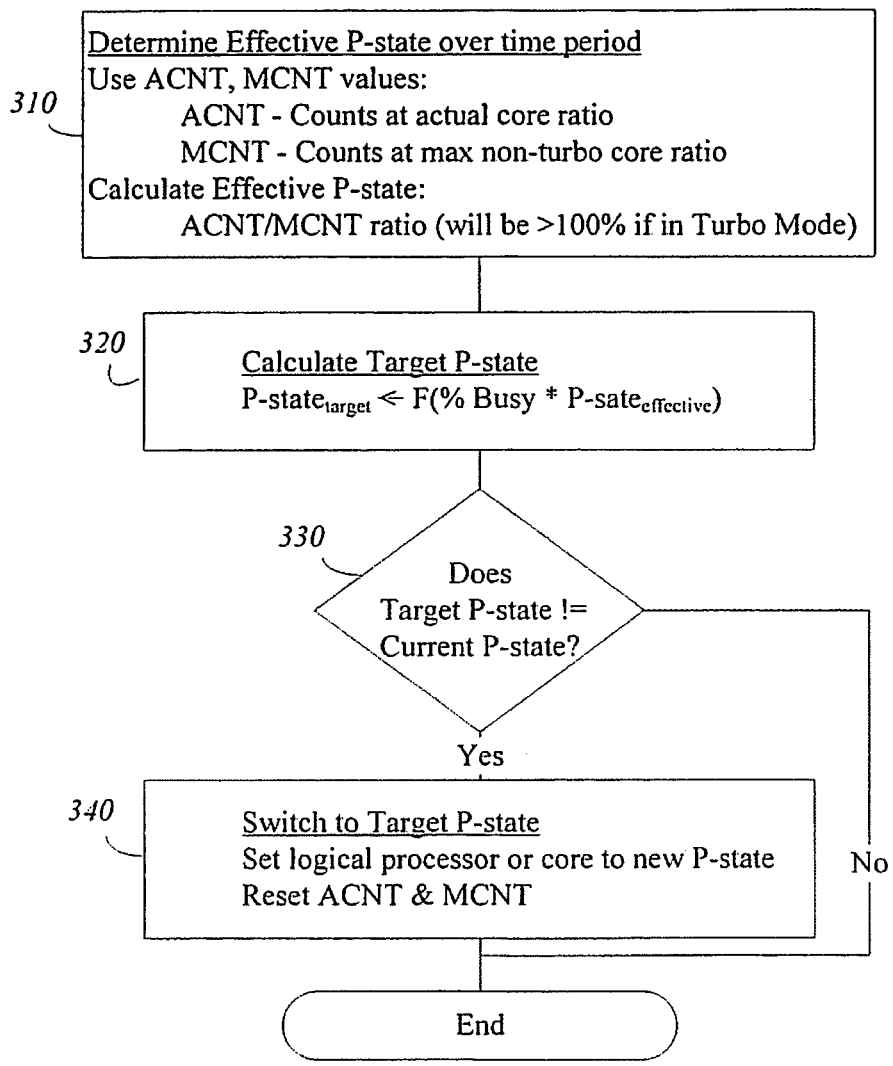
FIG. 3 is an illustration of flowchart of a method of calculating a target P-state in Turbo Mode capable processors according to exemplary embodiments of the invention.

Turning to FIG. 3, an illustration of flowchart of a method of calculating the target P-state in Turbo Mode capable processors according to exemplary embodiments of the invention is shown. According to some embodiments of the invention, the method of calculating the target P-state in TM capable processors (e.g., TM capable processor 130) may use a hardware coordinated feedback provided by counters (Actual Count) ACNT and (Maximum count) MCNT. The MCNT may count maximum number of execute clocks at the maximum non-turbo mode core frequency and the ACNT may count the number of execute clocks at actual core frequency.

According to this exemplary method of calculating the target P-state, in order to determine an effective P-State over a determent time period the ACNT/MCNT ratio is calculated (text block 310). For example, the effective P-state may be P-state$_{effective}$=(ACNT/MCNT)*100. If the P_state$_{effective}$ is greater then 100% the OSPM may have set the P-state to a turbo mode P-state.

According to this exemplary embodiment of the invention, the target P-state is calculated by multiplying the calculated effective P-state (e.g., P_State$_{effective}$) with a CPU utilization value (e.g., % Busy). P-state$_{target}$=% Busy*P_State$_{effective}$ (text block 320). If the target P-state is different then the current P-state (decision block 330) then OSPM may set a logical processor or a core to a new P-state and reset counters ACNT and MCNT (text block 340). If the target P-state is substantially equal to the current P-state, the current P-state may remain unchanged, although the scope of the present invention is in no way limited in this respect.

According to exemplary embodiments of the invention, on TM capable processors, when the processor is running in Turbo Mode ACNT/MCNT ratio may be greater than 100% and OSPM logic may select the TM P-state. In addition, ACPI P-state control algorithm may optimize a runtime power consumption of the TM enabled processor according to desired performance of the processor. An ACPI P-state control algorithm may dynamically adjust the TM enabled processor operation frequency of each core according to a software execution load of the processor.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of setting a performance state (P-state) of a turbo mode enabled processor having at least two or more cores, the method comprising:

determining an effective P-state over a predetermined time period based on a ratio of an actual count (ACNT) and maximum count (MCNT), wherein the MCNT counts the maximum number of execute clocks at a maximum non-turbo mode core frequency and the ACNT counts the number of execute clocks at actual core frequency and the effective P-state is P-state$_{effective}$=(ACNT/MCNT)*100; and setting the turbo mode enabled processor to a turbo mode P-state of each core of the two or more cores when the effective P-state value is greater than 100%, wherein the turbo mode P-state is represented by a number which is higher than an actual selectable frequency of a core of the two or more cores.

2. The method of claim 1, comprising:
calculating a target P-state (P-state$_{target}$) based on the effective P-state (P-state$_{effective}$) and a core utilization (% Busy) of the turbo mode enabled processor according to P-state$_{target}$=% Busy*P_State$_{effective}$.

3. The method of claim 2, comprising:
comparing between the target P-state (P-state$_{target}$) and a current P-state; and
resetting the P-state when the target P-state to is different from the current P-state.

4. The method of claim 1, wherein setting the turbo mode enabled processor to the turbo mode P-state comprises:
requesting a turbo P-state represented by a number which is higher than an actual selectable frequency of the core of the turbo mode enabled processor.

5. A processing platform comprising:
a Turbo Mode (TM) capable processor that includes two or more cores and an operating system to control performance of the two or more cores;
a performance state (P-state) table that includes a first entry P0 to provide a turbo mode performance information of a core of the two or more cores and at least a second entry P1 to P$_N$ to provide a performance information of the core P-state mode wherein the first entry includes information of TM frequency which is represented by a number which is higher then the actual selectable frequency of the core of the two or more cores;
an operating system power management (OSPM) to set a P-state of the TM capable processor according to the core performance control table first and the at least second entries; and
an Advanced Configuration and. Power Interface (ACPI) including two or more items of P-state information to enable the operating system power management (OSPM) to control each core power consumption according to the two or more items of P-state information.

6. The processing platform of claim 5, comprising:
a first counter operably coupled to the core to count maximum number of execute clocks at a maximum non-turbo mode core frequency over a predetermined time period; and
a second counter operably coupled to the core to count a number of execute clocks at an actual core frequency over the predetermined time period, wherein the Advanced Configuration and Power Interface is configured to calculate an effective P-state base on a ratio of the first counter to the second counter.

7. The processing platform of claim 5, comprising:
a core and wherein the Advanced Configuration and Power Interface is able to calculate a target P-state based on an effective P-state and a utilization value of the core.

8. The processing platform of claim 6, wherein the operating system power management module is configured to set the P-state according to a difference between the target P-state and a current P-state of the processor.

9. The processing platform of claim 6, wherein the P-state table comprises:
a selectable turbo P-state and one or more selectable actual P-states, wherein the selectable turbo P-state is selected when the effective P-state is higher then one hundred percent (100%).

10. A computer system comprising:
a liquid crystal display operably coupled to a computing platform, wherein the computing platform comprises:
a Turbo Mode (TM) capable processor that includes two or more cores and an operating system to control performance of two or more cores; and
a performance state (P-state) table that includes a first entry P0 to provide a turbo mode performance information of a core of the two or more cores and at least a second entry P1 to P$_N$ to provide a performance information of the core P-state mode wherein the first entry includes information of TM frequency which is represented by a number which is higher then the actual selectable frequency of the core of the two or more cores;
an operating system power management (OSPM) to set a P-state of the TM capable processor according to the core performance control table first and the at least second entries; and
an Advanced Configuration and Power Interface (ACPI) including two or more items of P-state information to enable the operating system power management (OSPM) to control each core power consumption according to the two or more items of P-state information.

11. The computer system of claim 10, wherein the computing platform comprises:
a first counter operably coupled to the core to count maximum number of execute clocks at a maximum non-turbo mode core frequency over a predetermined time period; and
a second counter operably coupled to the core to a count a number of execute clocks at an actual core frequency over the predetermined time period, wherein the Advanced Configuration and Power Interface configured to calculate an effective P-state base on a ratio of the first counter to the second counter.

12. The computer system of claim 10, wherein the computing platform comprises:
a core and wherein the Advanced Configuration and Power Interface is able to calculate a target P-state based on an effective P-state and a utilization value of the core.

13. The computer system of claim 12, wherein the operating system power management module is configured to set the P-state according to a difference between the target P-state and a current P-state of the processor.

14. The computer system of claim 12, wherein P-state table comprises:
a selectable turbo P-state and one or more selectable actual P-states, wherein the selectable turbo P-state is selected when the effective P-state is higher then one hundred percent (100%).

15. A turbo mode enabled processor comprising: a storage medium, said storage medium having stored thereon instructions that, when executed by a computing platform, result in:
determining an effective P-state over a predetermined time period based on a ratio of an actual count (ACNT) and Maximum count (MCNT), wherein the MCNT counts the maximum number of execute clocks at a maximum non-turbo mode core frequency and the ACNT counts the number of execute clocks at actual core frequency and the effective P-state is P-state$_{effective}$=(ACNT/MCNT)*100; and
setting the turbo mode enabled processor to a turbo mode P-state when the effective P-state value is greater than 100%, wherein the turbo mode P-state is represented by a number which is higher than an actual selectable frequency of an at least one core of the turbo mode enabled processor.

16. The turbo mode enabled processor of claim 15 wherein the instructions when executed result in:
    calculating a target P-state (P-state$_{target}$) based on the effective P-state (P-state$_{effective}$) and a core utilization (% Busy) of the turbo mode enabled processor according to P-state$_{target}$=% Busy*P_State$_{effective}$.

17. The turbo mode enabled processor of claim 15 wherein the instructions when executed result in:
    comparing between the target P-state and a current P-state; and
    resetting the P-state when the target P-state is different from the current P-state.

18. The turbo mode enabled processor of claim 15 wherein the instructions when of setting the turbo mode enabled processor to the turbo mode P-state when executed results in:
    requesting a turbo P-state represented by a number which associated with a highest actual core frequency of the turbo mode enabled processor.

* * * * *